Figure 1:
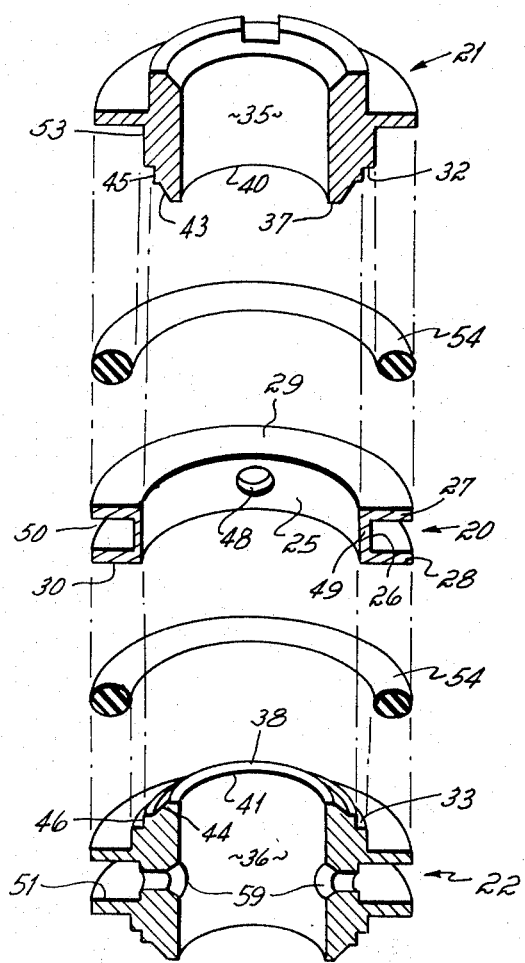

United States Patent [19]
Clippard, III

[11] 3,819,152
[45] June 25, 1974

[54] ANNULAR PORT CONSTRUCTION FOR SPOOL VALVE

[75] Inventor: William L. Clippard, III, Cincinnati, Ohio

[73] Assignee: Clippard Instrument Laboratory, Inc., Cincinnati, Ohio

[22] Filed: Sept. 1, 1972

[21] Appl. No.: 285,937

Related U.S. Application Data

[63] Continuation-in-part of Ser. No. 206,636, Dec. 10, 1971, Pat. No. 3,766,935.

[52] U.S. Cl......... 251/367, 251/DIG. 1, 137/625.48
[51] Int. Cl...................... F16k 27/04, F16k 11/00
[58] Field of Search.................... 251/DIG. 1, 367; 137/625.69, 625.48

[56] References Cited
UNITED STATES PATENTS

| | | | |
|---|---|---|---|
| 2,621,885 | 12/1952 | Schmitt | 251/DIG. 1 |
| 2,887,127 | 5/1959 | Broadbent | 251/367 X |
| 2,912,007 | 11/1959 | Johnson | 137/625.64 X |
| 2,920,652 | 1/1960 | Rudelick et al. | 137/625.48 X |
| 3,017,901 | 1/1962 | Hicks, Jr. | 251/DIG. 1 |
| 3,126,915 | 3/1964 | Hunt | 251/DIG. 1 |

FOREIGN PATENTS OR APPLICATIONS

1,376,217  9/1964  France........................ 137/625.69

Primary Examiner—Arnold Rosenthal
Attorney, Agent, or Firm—Wood, Herron & Evans

[57] ABSTRACT

A spool valve of the type wherein a flexible sealing member on a movable spool valves the flow of fluid through a port in the form of a narrow annular gap extending circumferentially around the spool chamber. The port is formed by a stack of three interfitting elements, including a pair of annular elements having opposed circular internal edges that form the respective edges of the port, and an annular locator which spaces the two port edge-forming elements apart and at the same time aligns them axially. Movement of the sealing member relative to the spool which carries it enables a "snap action" valving to take place as the sealing member moves across the port.

9 Claims, 6 Drawing Figures

PATENTED JUN 25 1974

3,819,152

SHEET 1 OF 2

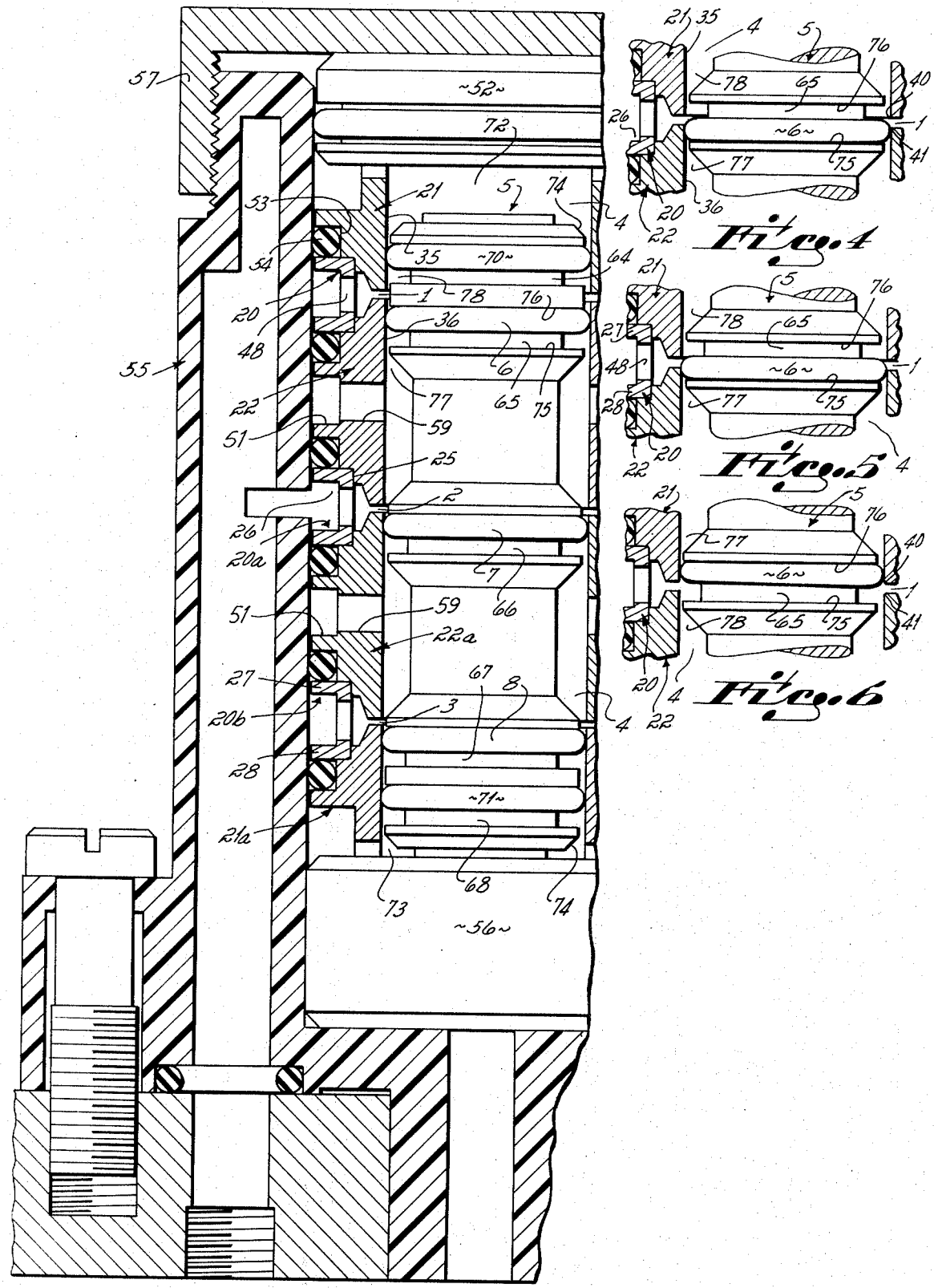

ANNULAR PORT CONSTRUCTION FOR SPOOL VALVE

This application is a continuation-in-part of my copending patent application Ser. No. 206,636, filed Dec. 10, 1971, now U.S. Pat. No. 3,766,935 entitled "Valve With Modular Manifold Body."

This invention relates to spool valves, and in particular to structure forming the internal porting in such valves.

In a spool valve the valving action takes place between a movable valve element, sometimes called a spool, plunger or slider, and a fixed port in the side wall of the spool chamber in the valve body. In the particular type of spool valves to which this invention relates, the porting is in the form of an annular gap or groove that extends circumferentially around the entire side wall of the chamber in which the spool slides. An O-ring or other flexible sealing member or gasket mounted on the spool is shifted, by spool movement, from a position on one side of the port or gap, across the port to the other side. This type of valving may be referred to as "across-the-gap" valving, because the sealing member on the spool moves across the fixed gap or port in the body.

Annular porting with across-the-gap valving is especially useful in valves which are operated as so-called digital, binary or "off-on" valves, to switch or change the flow path to which the port is connected by the spool. In such valves, a small shift in spool axial position, with respect to the port, can switch, reverse, or block flow through the port. The spool movement necessary for switching is small in comparison to spool valves of the same flow capacity but wherein the ports are not annular, for example, wherein the ports are drilled openings in the side wall. The rapidity of switching in response to a small change in spool position makes such valves highly responsive to changing inputs, control pressure or mechanical movements. For this reason miniature binary pneumatic valves—that is, valves having flow passages of about 1/8 inch diameter or less—are often used as switches in control and logic circuits.

In such valves, the small diameter of the spool chamber and the narrow width of the port make it relatively difficult and expensive to machine a clean, polished, precise internal groove, free from burrs, etc. An internal recessing operation is painstaking; brazing, threading or uniting of separately machined parts is expensive. These difficulties have hindered use of the gap or annular port construction, and it has not been widely employed in miniature valves.

This invention provides a valve construction wherein a port of the shape described is formed from separate but interfitting parts, which "stack" one upon the other to define a precise, clean gap port, and which at the same time align one another in the axial direction, so that the movable spool can be fitted in the internal valve chamber without further machining or alignment or truing. No brazing, soldering, threading or physical connection of the separate port-forming components is needed. This facilitates use of the annular port configuration in miniature and other valves, including particularly valves for use in pneumatic control and logic circuits. Valves incorporating such port-forming elements are economical to manufacture and assemble, and the modular elements of which they are comprised can be arranged in various combinations to provide a range of valves having a multiplicity of ports at different axial positions, for different controlling functions as desired.

Broadly put, a valve in accordance with this invention includes an annular internal port which is formed by three interfitting body elements, comprising a locating element and a pair of rigid port edge-forming elements engaging opposite sides of the locator element, and spaced apart axially by it. Each edge-forming element is annular or ringlike in shape, and has a cylindrical axial opening in it which comprises a part of the cylindrical surface of the internal chamber of the valve. Each edge-forming element has a surface which meets the central opening at a circular edge that comprises one of the edges of the port, and it includes an alignment surface spaced radially outwardly of and extending circumferentially around the port-defining edge. The locator is also annular and is seated between the two edge-forming elements, and at its opposite sides engages the respective alignment surfaces on the edge-forming elements, which it positions so that the openings of the respective edge-forming elements are axially aligned with one another. At least one of the elements includes a passage which communicates with the annular port, for carrying fluid flowing through the port. The elements are held in the stacked or interfitted relation by a surrounding sleevelike manifold or housing in which they are sealed.

An important further aspect of the preferred form of the invention is the mounting of a flexible sealing element (for example, an O-ring) on the spool in a manner which provides a snap action as the sealing element moves across the gap or port. The spool preferably mounts the O-ring or sealing member in a circumferential groove, and this groove is wider (in axial dimension) than the O-ring, such that the O-ring can change position or shift axially in the groove, with respect to the moving spool. When the spool carries the O-ring across the port, the axial direction of the fluid pressure on the O-ring switches or reverses, from one side of the O-ring to the other. The sealing member responds to this switch of pressure by rolling, deforming or sliding in its groove, from one side to the other. This movement pushes the area of O-ring/chamber wall contact from one side of the port to the other, thereby rapidly switching the valve from one state to the other. The rate of sealing member movement takes place more rapidly than the rate of movement of the spool itself, since the area of contact between the O-ring and the valve chamber wall moves in the direction of movement of the spool, but more rapidly than the spool.

THE PRIOR ART

Moog, Jr., U.S. Pat. No. 2,920,650 shows a valve fabricated from a series of port-forming elements, which are axially aligned or centered on a ceramic rod or mandrel, then brazed together, following which the aligning rod is removed. The porting is in the form of a series of spaced rectangular openings rather than a continuous annular gap.

Lucien U.S. Pat. No. 3,081,794 shows a valve porting formed by an assembly of sleevelike elements that are centered on a rod, ground externally to size, then shrink fitted in a surrounding sleeve. The ports are not annular, and the elements do not align one another.

In Pearson U.S. Pat. No. 3,163,175, a spacer is provided between a pair of port edge-forming elements, but it does not interfit with or radially align the latter, and there is no across-the-gap valving.

Foster U.S. Pat. No. 3,199,540 provides a spacer between a pair of O-rings in the valve body, which form seals with lands on a spool. No across-the-gap valving occurs, nor is there snap-action switching. The same is true of Stryker U.S. Pat. Nos. 3,352,325 and 3,433,267. In such valves, O-rings are compressed axially under pressure and can squeeze into the path of spool movement and thereby impede the valve action. Cowdin U.S. Pat. No. 3,451,430 is similar, but uses flat apertured sealing rings in the valve body rather than O-rings.

In Ring U.S. Pat. Nos. 3,477,685 and 3,477,692, ringlike spacers are shown between port-defining elements, but there is no centering relation between them, and there is no across-the-gap valving.

Figure 2:
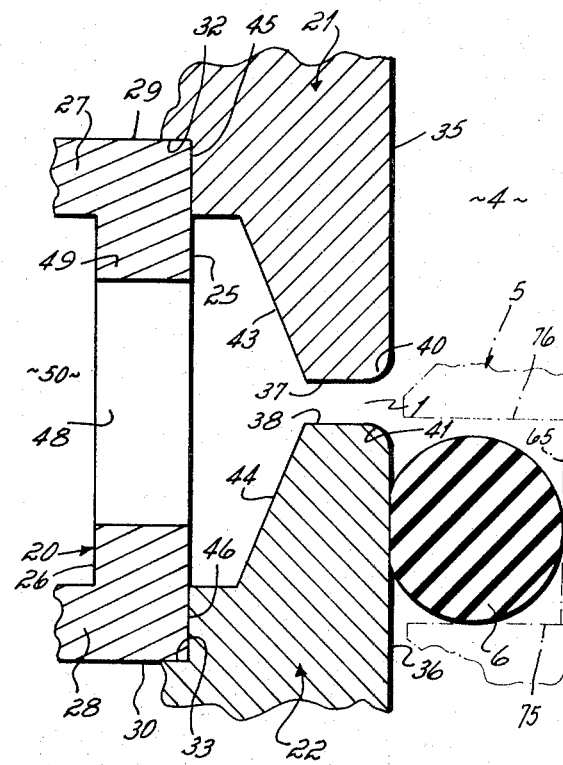

The invention can best be further described by reference to the accompanying drawings, in which:

FIG. 1 is an exploded perspective view of valve port-forming elements, partly in section, in accordance with a preferred embodiment of the invention, FIG. 2 is an enlarged fragmentary axial section of a port assembled from elements shown in FIG. 1, and includes a sealing portion of the spool that contacts with the port to form a valve, FIG. 3 is an enlarged partial axial section of a miniature pneumatic four-way valve having three annular ports, each formed in accordance with a preferred embodiment of the invention, FIGS. 4, 5 and 6 are a sequence of views, each being a partial axial section of port and spool, illustrating the snap action of the spool O-ring as it is moved across the port, FIG. 4 showing the O-ring approaching one side of the port, FIG. 5 showing the O-ring jumping across the middle of the port, and FIG. 6 showing the O-ring after it has snapped or traversed rapidly to the opposite side of the port.

The valve port-forming construction of this invention is suitable for use in many different types and configurations of spool valves. For purposes of explanation, and without intending to limit the environment or utility of the invention, the invention is illustrated as embodied in a pneumatic miniature spool valve having a manifold body of the type disclosed in my co-pending patent application Ser. No. 206,636, previously identified. As best shown in FIG. 3, this valve is a four-way valve and includes a plurality of annular ports, designated as 1, 2 and 3, that enter the internal valving chamber 4 at spaced axial positions. Each of ports 1, 2 and 3 is formed in accordance with the invention.

A spool generally at 5 is axially shiftable in chamber 4, and it mounts a series of flexible sealing members comprising O-rings 6, 7 and 8 that cooperate with the respective body ports 1, 2 and 3 to valve the flow of fluid through the respective port. It will be apparent that the invention can be used in valves having a smaller or a larger number of ports than the three ports shown, including single port valves.

Each port 1, 2 and 3, is formed of an annular gap that extends circumferentially around the cylindrical side wall surface of internal chamber 4. As is apparent in FIG. 3, each port has a circumferential length which is many times its axial dimension. For example, in one embodiment the port has a width (as measured in the axial direction) of .012 inch, and a circumferential length of about 1.37 inches. Each port is generally similar, although they differ in detail, as will be described.

FIGS. 1 and 2 show components that form port 1 of the assembled four-way valve shown in FIG. 3. Port 1 is formed by three interfitting port-forming elements 20, 21 and 22. Element 20 is a locator or spacer element, and is in the form of an annulus or ring having a cylindrical inner surface 25 with an inside diameter greater than that of chamber 4. The locator element 20 has an outwardly opening groove or channel 26 around it. The rims or flanges on opposite sides of groove 26 are designated 27 and 28. The opposite axial surfaces of the locator element 20, designated at 29 and 30 respectively, engage corresponding surfaces 32 and 33 presented by the port edge-forming elements 21 and 22, respectively. Locator 20 thus spaces those elements apart.

Each element 21 and 22 is annular and has a cylindrical inside surface, designated at 35 and 36 respectively, each having the same diameter. Those surfaces 35 and 36 provide portions of the valve side wall which defines the chamber 4. As described hereinafter in detail, the elements 21 and 22 are held in coaxially aligned positions by the element 20 which also spaced them apart.

Elements 21 and 22 have surfaces 37 and 38 respectively, which are oriented to face one another. Surfaces 37 and 38 meet the respective surfaces 35, 36 at circumferential edges 40, 41, which are the edges of annular port 1. Each edge 40, 41 may have a radius or chamfer as shown, to facilitate smooth movement of the spool O-ring past it. It is desirable, although not essential, that each element 21 and 22 have a conical tapered surface as at 43 and 44 leading to the lateral surface 37 and 38 or to the edge 40, 41 respectively.

Each element 21 and 22 also includes an alignment surface which, in the embodiment shown, is in the form of an outwardly facing circular step or shoulder 45 and 46, having a diameter corresponding to the diameter of inside surface 25 of spacer 20. The lateral or transverse surfaces 32 and 33 of elements 21 and 22 meet the shoulders 45 and 46 respectively at right angles, and two inner edges of the locator element fit in the corresponding corners.

Flow openings or apertures 48 extend through the vertical wall or web 49 of locator 20 at spaced intervals. The openings 48 provide radial communication between port 1 on the inside of the locator, and the chamber 50 within the external groove 26 of the locator.

With reference to FIGS. 1 and 3, it can be seen that the port edge-forming elements 21 and 22 are not necessarily identical with one another, although they may be. In the embodiment shown, element 21 is adapted to abut (at the side thereof remote from port 1) a plug 52, which forms a closure of the end of chamber 4. A neck or groove 53 is formed around the external periphery of element 21, outwardly of shoulder 45 thereof, and when the spacer 20 is seated against the shoulder as shown in FIG. 3, its flange 27 and the neck 53 of element 21 cooperate to define a channel in which an O-ring 54 is retained. This O-ring forms a seal at the upper side of spacer 20, to the manifold through which flow is carried to or from the spacer groove 50. It is an advantage of this construction that it provides an excellent static pressure seal, in that there is no internal leakage path which is not closed by an O-ring.

In the embodiment shown, element 22, in contrast to element 21, is symmetrical about a transverse plane through its axial midpoint, the lower half being identical to the upper half, and each half being configured lik the port edge-forming portion of element 21. A radially outwardly opening fluid channel 51 is formed around element 22, and is connected to the inner cylindrical surface 36 of the element by openings or passages 59, 59. Thus, element 22 has a port forming edge, similar to the edge 41 described above, at its lower face as well as its upper face, and can be used with another similar locator and edge-forming element to form a second port, such as port 2. Thus, to form a multiport valve, additional annular ports can be formed by stackng another locator, indicated at 20a (see FIG. 3) on the lower side of valve element 22, then another element 22a similar to the first described element 22, followed by another spacer 20b, and so on, until the desired number of ports is obtained. As shown in FIG. 3, the multiport valve is completed by another element 21a. Each of the respective locators is sealed on each side at the manifold wall by an O-ring, for example, such as the ring 54 already described, between the locator flange and the adjacent rim of the element 21 or 22.

Fluid communication through the valve body with port 1, and with the other ports 2 and 3, is provided through an outer surrounding manifold or housing 55 in which the valve is housed. The manifold construction illustrated does not form a part of this invention, and is the subject of my previously identified copending patent application Ser. No. 206,636, to which reference may be had for a more complete description. The manifold comprises the housing for the valve, closes the locator grooves as at 50 through which fluid flows to or from the corresponding port 1, 2 or 3, and provides selective fluid communications to those grooves. At the same time, it holds the respective elements of the valve, including those shown at 20, 21 and 22 in stacked, assembled relation, bearing upon them axially at opposite ends thereof, as at 52 and 56. The outer end plug 52 is held in place by a manifold cap 57, and 56 may be a plug or may be the bottom of the manifold cavity.

It can be seen from the drawings that each of the ports or gaps 1, 2 and 3 is continuous around the periphery of chamber 4, and is not interrupted or broken at any point. It is an advantage of the invention that the ports 1, 2 and 3 can be precisely formed to provide a narrow, smooth, clean gap. This is a substantial advantage over prior art valves having annular ports formed by internal grooving. Formation of such a narrow groove in an integral body would require an undercutting or internal grooving operation, and the deburring and cleaning of such a groove would be difficult and time consuming.

The port 1 is formed simply by stacking the elements 21 and 22 on opposite sides of spacer 20. The locator 20 is seated against the alignment surface 45 or 46 of one of the port edge-forming elements 21 or 22, and the alignment surface 46 or 45 of the other element 22 or 21 is seated on the other edge 29 or 30 of the locator. The locator spaces the two edges 40 and 41 of the edge-forming elements 21 and 22 apart by a precise dimension, and at the same time aligns the cylindrical surfaces 35 and 36 thereof concentrically so that they form a cylinder of uniform diameter.

The shiftable spool valve member that coacts with the respective ports to valve the flow of fluid is best shown in FIG. 3. A plurality of grooves are formed around its external surface, as designated at 64–68, and they contain the O-rings 70, 6, 7, 8 and 71 respectively. The rings 6, 7, 8 cooperate with the ports 1, 2 and 3 to provide "across-the-gap" valving, and the rings 70 and 71 seal pilot pressure chambers 72 and 73 at the ends of the spool in chamber 4. The body of the spool may be made of a conventional material such as Nylon, Delrin or brass, and does not itself contact or form a seal with the wall of chamber 4. To position an O-ring in its respective groove 64–68, the ring is rolled over the tapered spool surface, as at 74, adjacent the groove.

It will be noted that the axial width of grooves 65, 66 and 67, in which the valving O-rings are contained, is preferably slightly greater than the width of the O-ring therein, so as to permit the O-ring to shift axially, from side to side of the groove. For example, an O-ring of .070 inch thickness is suitably received in a groove which is .075 inch wide. It will further be seen (FIG. 2) that the width of the flat on the O-ring where it engages the spool chamber wall, is greater than that of the port which it valves, and that in use it forms a sliding seal that "spans the gap" or width of the port as it moves across the port when the spool is shifted.

Provision of an O-ring retaining groove having a width which is greater than that of the O-ring in the groove so that the O-ring can shift axially in it, or the provision of a sealing member which can yield axially in response to pressure on an opposite side, affords an unexpected benefit in the rapidity of valve action. This is illustrated in the sequence shown in FIGS. 4, 5 and 6, which illustrate the relative positions of O-ring 6 as it moves upwardly, across port 1. In the position shown in FIG. 4, the drag of the upwardly moving O-ring 6 on the side wall of chamber 4 holds it against the lower side 75 of groove 65 in which it is contained. Assuming that port 1 is under pressure relative to the space 77 below O-ring 6, that pressure acts on the upper surface of the O-ring to hold it downwardly against groove side 75.

As illustrated in FIG. 5, as spool 5 continues to move upwardly, O-ring 6 "wipes" across port 1. There is no cutting, scoring or tearing of the O-ring and the O-ring does not jam or stick as it crosses the rounded edges of the annular port. It is unnecessary to provide ribs extending across the port between the surfaces 37 and 38 to support the O-ring as it wipes across the port. Tests have shown that such valves can withstand millions of cycles of operation without loss of seal.

It should be noted that the axial width of the O-ring is substantially greater than that of the respective gap or port with which it cooperates (in example described, 0.070 inch compared to a gap of 0.012 inch). This minimizes the possibility of O-ring "extrusion" under pressure into the gap, which could cause shearing or increased wear.

When the O-ring has moved sufficiently far that a path is opened between port 1 and space 77 beneath the ring, the sudden application of pressure from port 1 into space 77 reverses the pressure forces acting on the O-ring and this "snaps" the O-ring 6 upwardly from the lower side surface 75 of groove 65, against upper groove surface 76. This snapping or rolling action causes the flat area of O-ring contact with the spool chamber wall to move across the port much more rapidly than spool 5 itself is moving (compare FIGS. 5 and 6). Thus, the actual valving operation takes place very rapidly, and the port quickly changes from communication with the space 78 above the ring, to the space 77 below the ring. This occurs by reason of the narrow annular width of the port, combined with the snap or roll of the O-ring.

From the foregoing description, those skilled in the art will understand that, in addition to the advantages and features already described, it is a further advantage of the invention that the port-forming elements 20, 21 and 22 are modular and can be stacked in different and multiple arrangements with one another, to provide a wide variety of valves, including three-way valves, four-way valves, check valves, shuttle valves, needle valves, flow control and other types of valves. A number of different modular constructions utilizing such components are shown in my co-pending application previously identified.

Having described the invention, what is claimed is:

1. A spool valve comprising,
   a body having an internal spool chamber with a cylindrical side surface,
   a spool shiftable in said chamber,
   a port opening to the said cylindrical surface through said body, said spool forming a valve with said port, said port in the form of a narrow annular gap extending around substantially the entire cylindrical surface of the chamber,
   said body including two annular port edge-forming elements each presenting a circumferential internal edge,
   an annular locator element between and contacting on its opposite sides each said port edge-forming element and spacing them apart such that the said edges define said port between them, said locator element interfitting with circular shoulders on said edge-forming elements to align them coaxially, the edge-forming and locator elements thereby being handleable as a self-aligning stack for each of assembly in said chamber,
   said locator element and at least one of said edge-forming elements each presenting a radially outwardly opening, U-shaped channel which extends around the periphery of the respective element,
   passage means extending through said locator element between the channel thereon and said port,
   the channel of said locator element running between two flanges formed thereon which are spaced apart by a web of the locator element,
   and an opening through said one of said edge-forming elements between the channel thereon and said chamber,
   said spool in use valving flow of fluid in the path between the chamber of said locator, said port, said chamber, and the channel of said one edge-forming element.

2. The spool valve of claim 1 wherein said flanges have an outside diameter which is substantially equal to that of each said port edge-forming element.

3. The spool valve of claim 2 wherein an O-ring is disposed between each flange of said locator element and the respective adjacent edge-forming element.

4. The spool valve of claim 1 wherein the flanges and web of said locator element meet at right angular circular edges, which edges are seated in shoulders presented by the respective adjacent port edge-forming element, thereby to align them coaxially.

5. A spool valve having an internal spool chamber, a spool shiftable axially in said chamber, and an annular port which opens to said chamber through the side surface thereof, said spool mounting a flexible sealing member around it which is shiftable by spool movement across said port from one side thereof to the other to change the flow of fluid through the port,
   said annular port being formed by three interfitting elements comprising,
   an annular locator element,
   and two rigid port edge-forming elements engaging opposite sides of said locator element and spaced apart axially by the latter,
   each edge forming element being annular and having a cylindrical axial opening in it which comprises a part of the side surface of the said internal chamber of said valve, each said edge-forming element having a surface which meets the said opening therein at a circular edge comprising one of the edges of said annular port, each said edge-forming element also including a cylindrical shoulder spaced radially outwardly of and concentrically around said edge, said shoulder defining an axial alignment surface,
   said locator element being seated between the two said edge-forming elements with its opposite sides engaging the respective alignment surfaces thereof, the locator element and said alignment surfaces coacting so that the openings of the respective edge-forming elements are axially aligned with one another, the diameter of said openings being equal,
   the locator element spacing the said edge-forming elements apart to define said port between them,
   said locator element and at least one of said edge-forming elements each having a radially outwardly opening channel around it for fluid flow to or from said chamber, each said chamber extending around the circumference of the respective element,
   said locator element comprising two spaced apart, radially outwardly extending flanges joined by a cylindrical web, the channel thereof being defined between said flanges and web, the web surrounding the shoulder of the respective edge-forming element and thereby aligning the latter axially with the locator element,
   a passage through the web of said locator element for communication between the channel thereon and said port,
   and a passage through said one of said edge-forming elements for communication between the channel thereon and said chamber,
   said spool valving fluid flow between the two said channels through said port and chamber.

6. A spool valve comprising,
   a body having an internal spool chamber with a cylindrical side surface,
   a spool shiftable in said chamber,
   a port opening to the said cylindrical surface through said body, said spool forming a valve with said port, said port in the form of a narrow annular gap extending around substantially the entire cylindrical surface of the chamber, said body including two annular port edge-forming elements each presenting a circumferential internal edge, an annular locator element between and contacting on its opposite sides each said port edge-forming element and spacing them apart such that the said edges define said port between them, said locator element interfitting with said edge-forming elements to align them coaxially, said locator element aligning the edge-forming elements by interfitting with a circular shoulder on each said edge-forming element, each said edge-forming element having a flange around an external surface thereof, an O-ring being carried thereon to provide a seal between the edge-forming and locator elements, said locator element and at least one of said edge-forming elements each presenting a radially outwardly opening channel which extends around the periphery of the respective element, passage means extending through said locator element between the channel thereon and said port, and an opening through said one of said edge-forming elements between the channel thereon and said chamber, said spool in use valving flow of fluid in the path between the channel of said locator, said port, said chamber, and the channel of said one edge-forming element.

7. A spool valve having an internal spool chamber, a spool shiftable axially in said chamber, and an annular port which opens to said chamber through the side surface thereof, said spool mounting a flexible sealing member around it which is shiftable by spool movement across said port from one side thereof to the other to change the flow of fluid through the port, said annular port being formed by three interfitting elements comprising, an annular locator element, and two rigid port edge-forming elements engaging opposite sides of said locator element and spaced apart axially by the latter, each edge-forming element being annular and having a cylindrical axial opening in it which comprises a part of the side surface of the said internal chamber of said valve, each said edge-forming element having a surface which meets the said opening therein at a circular edge comprising one of the edges of said annular port, each said edge-forming element also including a cylindrical shoulder spaced radially outwardly of and concentrically around said edge, said shoulder defining an alignment surface, said locator element being seated between the two said edge-forming elements with its opposite sides engaging the respective alignment surfaces thereof, the locator element and said alignment surfaces coacting so that the openings of the respective edge-forming elements are axially aligned with one another, the diameter of said openings being equal, the locator element spacing the edge-forming elements apart to define said port between them, said locator element and at least one of said edge-forming elements each having a radially outwardly opening channel around it for fluid flow to or from said chamber, each said channel extending around the circumference of the respective element, the channels in said locator element and on said one of said edge-forming elements each being defined between two axially spaced flanges on the respective element, all of said flanges having substantially the same outside diameter and defining the diameter of said chamber, a passage through said locator element for communication between the channel thereon and said port, and a passage through said one of said edge-forming elements for communication between the channel thereon and said chamber, said spool valving fluid flow between the two said channels through said port and chamber.

8. The valve of claim 7 wherein said flanges are relatively thin in the axial direction.

9. The valve of claim 7 wherein an O-ring is provided between a flange of the said locator element and the flange which is adjacent to it on said one of said edge-forming elements, said O-ring providing a seal between the respective elements.

* * * * *